UNITED STATES PATENT OFFICE.

ALBERT LECOEUR, OF ROUEN, FRANCE.

PREPARATION OF AMMONIACAL COPPER SOLUTIONS.

No. 863,802.
Specification of Letters Patent.
Patented Aug. 20, 1907.

Application filed August 4, 1906. Serial No. 329,174.

*To all whom it may concern:*

Be it known that I, ALBERT LECOEUR, of 98 Avenue du Montriboudet, Rouen, Seine Inferieure, France, manufacturer, have invented certain new and useful Improvements in the Preparation of Ammoniacal Copper Solutions, of which the following is a specification.

This invention relates to the preparation of concentrated solutions of hydrated cuprammonium oxid of a high solvent power on cellulose.

It is a simple matter theoretically to dissolve cellulose in solutions of cupric oxid in ammonia, but in the manufacture of "artificial silk" a number of difficulties are encountered owing to the necessity of bringing a sufficient quantity of cellulose into solution to insure that it shall possess the required degree of viscosity for the spinning operations.

In the preparation of hydrated cuprammonium oxid by treating salts of cupric oxid with ammonia and soda, only dilute solutions can be employed, which furnish in the cold such small quantities of pure hydrated oxid as to be without interest from the industrial standpoint. Concentrated liquors deposit a precipitate of sodium salt insoluble in the cupric medium, which renders the cellulose solution unsuitable for spinning and reduces the strength of the fiber. On the other hand the cupro-ammoniacal liquors obtained in oxidation vats by the simultaneous action of air or oxygen and concentrated ammonia solution on the copper metal until saturation with the oxid of copper is complete, contain salts of a deleterious nature in addition to the active hydrated cuprammonium oxid.

Up to the present whatever the method employed for the preparation of the cupro-ammoniacal liquor, it has been necessary in order to facilitate the solution of pure cellulose (hydro-cellulose, alkali-cellulose, hydrate of cellulose) to fix a certain quantity of copper in the cellulose either by mordanting, or by precipitation, or by employing a mechanical mixture, thus forming a copper compound of cellulose which is more soluble in ammonia. This weighting with cupro-cellulose possesses the drawback that it leaves in the cellulose liquors a number of impurities such as sulfate of soda, metallic copper, oxid of copper, and the like, from which it is very difficult to free them. By means of the present invention all these mechanical or chemical devices are avoided.

During the action of the air or oxygen and ammonia on metallic copper in the oxidation vats, the oxygen transforms the ammonia into water and nitrous acid, and at the same time oxidizes the copper. Three substances are therefore produced: Hydrated cuprammonium oxid, ammonium nitrate, copper nitrite of which the first alone has the property of dissolving cellulose, the other two being without useful action.

The present invention has reference to the oxidation methods above mentioned and aims at the preparation of a liquor rich in active copper and containing substantially no nitrites. A low temperature, which retards the formation of a large quantity of nitrite, does not suffice, as it tends to diminish also the rapidity of production of hydrated cuprammonium oxid.

According to my invention I conduct the operation as follows:—I add to the liquid treated in the oxidation vats or vessels from the commencement of the reaction and preferably at a temperature of about 0°C. a relatively small quantity of caustic soda or potash, approximately equivalent to the quantity of nitrous acid formed during the operation. The presence of this base has the following effects,—the soda or potash reacts with the nitrites and brings about decomposition with the production of,—

1. Nitrite of sodium or potash.
2. Hydrated cupric oxid, which dissolves in the ammoniacal medium forming hydrated cuprammonium oxid, and
3. Ammonia gas which dissolves in the liquor contained in the oxidation vat.

On the other hand it is known that in the presence of ammonia and metallic copper, nitrite of sodium is reduced in the cold to nitrogen, oxid of copper, soda and water. A good yield of colloidal hydrated cuprammonium oxid is thus obtained containing scarcely any other impurity than the soda or potash added, which as it is continually regenerated, only requires to be added in very small quantities in proportion to the nitrous acid formed, which amounts to about 4 grams for each 35 grams oxid of copper per liter.

Prepared under the above favorable conditions the ammoniacal copper solution nevertheless still contains some impurities which at the least rise of temperature bring about its decomposition or reduce its solvent properties for cellulose. In order to prevent this tendency to decomposition I purify the ammoniacal copper solution by means of dialysis, and thus obtain the purified hydrated cuprammonium oxid in a colloidal form, which is the active solvent for cellulose.

For the dialysis of the ammoniacal copper solutions I may use any suitable form of dialyzer. The diaphragms or septa employed should be of suitable porosity since if they are not sufficiently porous the dialysis takes too long and decomposition is liable to occur while if they are too porous water may return through them into the solution and detrimentally affect the result. In practice I have found that porcelain diaphragms of suitable porosity give good results. The operator accustomed to dialyzing work will be able to determine the most suitable porosity by a few trials.

One example of a suitable material for forming the diaphragms is what is known as "asbestos porcelain," i. e. porcelain made with asbestos. The diaphragms of this material with which the best results are obtained will absorb about half their weight of water; this amount may vary slightly according to the firing. One sample of asbestos porcelain which has been employed with advantage weighed when dry 50 grams, and after immersing in distilled water weighed 75 grams. If the proportion of nitrates present in the solution is 5 grams and one liter, 1 square meter of diaphragm surface will purify about 40 liters of ammoniacal solution in an hour.

The dialysis is stopped when the solution of cuprammonium hydroxid is freed from the impurities which can be ascertained by testing the solution from time to time as will be well understood. The purification of the ammoniacal copper solutions can also be effected simultaneously with their production by establishing a continuous circulation of liquor from the oxidation vat to the dialyzer and vice versa.

After dialysis the colloidal hydrated cuprammonium oxid is no longer liable to undergo change at ordinary temperatures. Further it differs from the ammoniacal copper solutions prepared by the usual processes in that substantially all the copper present is in an active state and the solution therefore possesses a higher solvent power for cellulose than an ammoniacal solution containing a like percentage of copper prepared as usual.

Concentrated solutions of cellulose made from the purified colloidal hydrated cuprammonium oxid are perfectly uniform and furnish excellent results in the manufacture of threads having a silky appearance and similar products.

In order to increase the rapidity with which the solution prepared as above described will dissolve the cellulose it is desirable that they shall contain an excess of ammonia. During the dialysis some ammonia may diffuse through the diaphragms with the impurities. When the dialysis is complete this loss of ammonia may be compensated for by the addition of a corresponding quantity determined by titration previously to the dyalysis.

To increase the rapidity with which the cellulose can be dissolved a small quantity of caustic soda, or caustic potash may be added to the dialyzed solution.

What I claim and desire to secure by Letters Patent is:—

1. Process of making an ammoniacal copper solution, comprising the oxidation of metallic copper in the presence of ammonia and water, adding to the liquid a caustic alkali approximately equivalent in quantity to the amount of nitrous acid formed during the reaction, and dialyzing the resulting solution.

2. Process of making an ammoniacal copper solution comprising the oxidation of metallic copper in the presence of ammonia and water, adding to the liquid in the cold a quantity of caustic alkali approximately equivalent to the amount of nitrous acid formed during the reaction, and dialyzing the resulting solution substantially as described.

3. Process of making an ammoniacal copper solution, comprising the oxidation of metallic copper in the presence of ammonia and water, adding to the liquid in the cold a quantity of caustic alkali approximately equivalent to the amount of nitrous acid formed during the reaction dialyzing the resulting solution and adding ammonia to the solution substantially as described.

4. Process of making an ammoniacal copper solution, comprising the oxidation of metallic copper in the presence of ammonia and water, adding to the liquid in the cold a quantity of caustic alkali approximately equivalent to the amount of nitrous acid formed during the reaction, and dialyzing the liquid contemporaneously with said oxidation, substantially as described.

5. Process of making an ammoniacal copper solution, comprising the oxidation of metallic copper in the presence of ammonia and water, adding to the liquid in the cold a quantity of caustic soda approximately equivalent to the amount of nitrous acid formed during the reaction and dialyzing the resulting solution.

6. Process of making an ammoniacal copper solution comprising the oxidation of metallic copper in the presence of ammonia and water, adding to the liquid in the cold a quantity of caustic soda approximately equivalent to the amount of nitrous acid formed during the reaction, dialyzing the resulting solution and adding ammonia thereto.

7. As a new article of manufacture, a solution of colloidal hydrated cuprammonium oxid substantially free from crystalloid salts and containing a small quantity of caustic alkali in solution.

8. As a new article of manufacture a solution of colloidal hydrated cuprammonium oxid substantially free from crystalloid salts and containing a small quantity of caustic soda in solution.

In witness whereof, I have hereunto signed my name in the presence of two subscribing witnesses.

ALBERT LECOEUR.

Witnesses:
 OSCAR MALMROS,
 PAUL RUDOLF.